June 8, 1965 L. S. McMILLIAN, JR., ETAL 3,188,394

LOW-LEVEL TIME DIVISION MULTIPLEX SYSTEM

Filed Sept. 12, 1961 2 Sheets-Sheet 1

INVENTORS
JOHN H. SEARCY &
LONNIE S. McMILLIAN, JR.
BY Hurvitz and Rose
ATTORNEYS INVENTORS
JOHN H. SEARCY &
LONNIE S. McMILLIAN, JR.
BY
Hurvitz and Rose
ATTORNEYS

United States Patent Office 3,188,394
Patented June 8, 1965

3,188,394
LOW-LEVEL TIME DIVISION MULTIPLEX SYSTEM

Lonnie S. McMillian, Jr., and John H. Searcy, Fort Lauderdale, Fla., assignors to Radiation, Inc., Melbourne, Fla., a corporation of Florida Filed Sept. 12, 1961, Ser. No. 137,697
10 Claims. (Cl. 179—15)

The present invention relates generally to multiplex systems and more particularly to a time division multiplex system adapted to handle low level signals.

Previously, attempts to multiplex low level signals, such as generated by thermocouples or other similar transducers, have not been completely satisfactory because of loss in intelligence between the input channels and the common channel. Use of D.C. circuits exclusively is not desirable because of drift associated with the necessary amplifying elements. For low signal levels, the drift amplitude introduced is frequently of the same order of magnitude as the signal. Drift is eliminated by employing transformer coupling. Transformer coupling is objectionable, however, due to microphonics induced by low frequency mechanical disturbances and distortion introduced by saturation resulting from energy storage of a particular polarity.

Accordingly, an object of the present invention is to provide a new and improved time division multiplex system, particularly for low level signals.

An additional object is to provide a time division multiplex system, that does not introduce any appreciable drift in the low level signals applied thereto and which supplies a faithful reproduction of the input signals to a common output channel.

Another object is to provide a time division multiplex system that modulates the input signals and supplies the modulated signal to transformer means, thereby reducing distortion.

A further object is to eliminate microphonics by sequentially modulating the input signal with high frequency opposite polarity pulses and synchronously rectifying the opposite polarity pulses so any noise is cancelled.

An additional object is to provide a low level time division multiplex system employing transformers but which does not introduce core storage because opposite polarity modulated signals are always sequentially employed.

Still another object is to provide a time division multiplex system which employs a minimum of parts, is relatively inexpensive to manufacture and service, is compact and does not require a great deal of power.

Basically, the present invention employs a plurality of channels, each having an input signal applied thereto. Each channel is sequentially energized, at different times so only one is actuated at any instant. The input signals are periodically converted or modulated into single cycle A.C. signals having substantially equal amplitude and duration in the positive and negative portions. In one embodiment this conversion is effected by a single, center tap transformer wherein the input signal of each channel is supplied to one end of the transformer for a predetermined time interval and immediately thereafter applied to the other end of the transformer. In another embodiment, a separate transformer is connected in each input channel.

The secondary windings in both embodiments feed the resultant time division, modulated, multiplex signal to an A.C. amplifier which feeds a full wave rectifier, synchronous with the switching operation of the center tapped transformer. The rectifier output signal is a subtraction of the positive portion of the signal from the negative portion. Since any noise introduced by microphonics is of considerably lower frequency than the frequencies associated with each signal portion, cancellation thereof is effected. Energization of the transformer primary windings in one direction and then another eliminates distortion because energy storage, causing flux saturation, cannot result.

The above and still further objects, features and advantages of the present invention will become apparent upon consideration of the following detailed description of one specific embodiment thereof, especially when taken in conjunction with the accompanying drawings, wherein.

Figures 1, 2, 5:
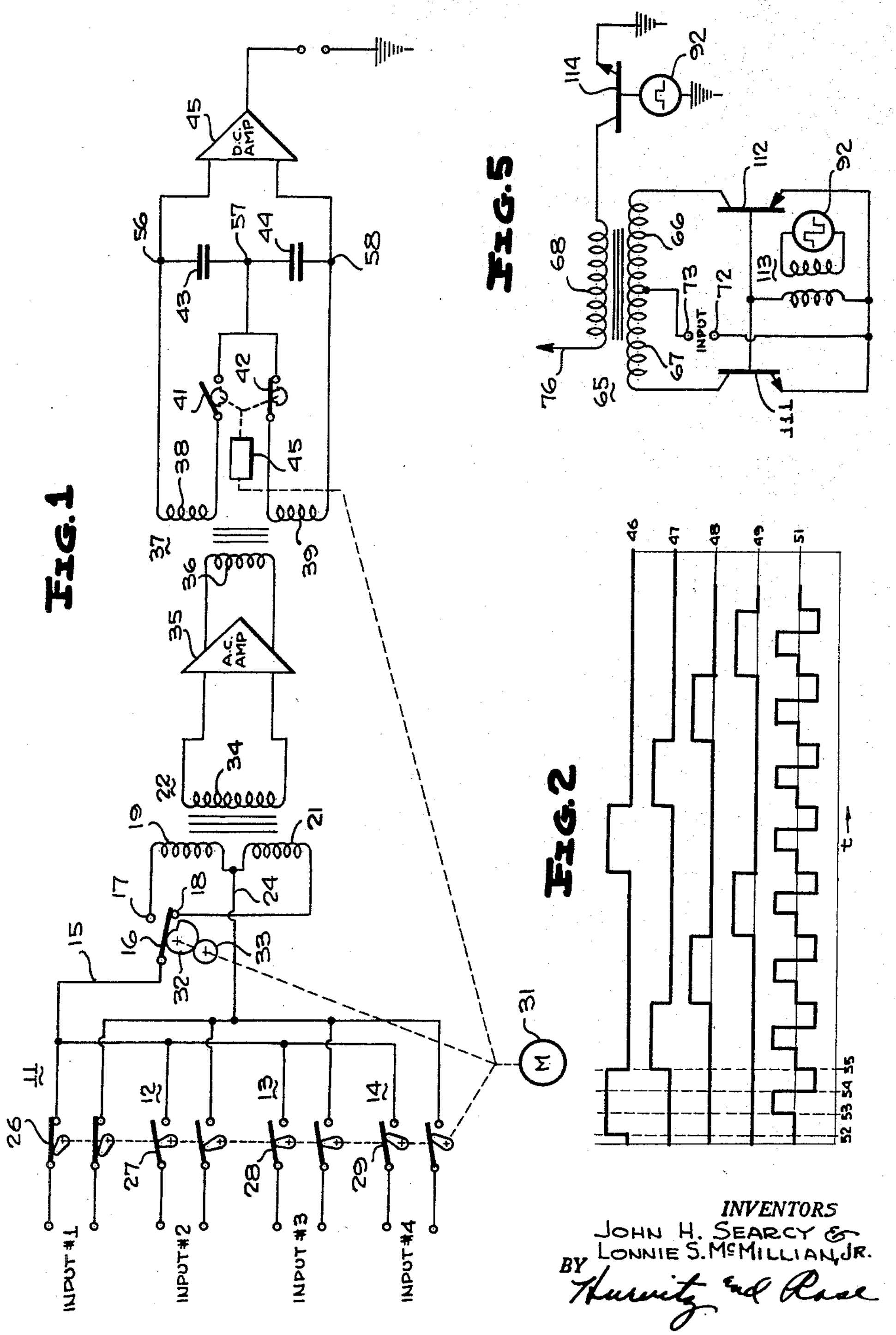
FIGURE 1 is a schematic diagram of one preferred form of the present invention.
FIGURE 2 is a timing diagram associated with the apparatus of FIGURE 1.
FIGURE 5 is a circuit diagram of a single channel of the apparatus of FIGURE 3.

FIGURE 1, the schematic diagram of one form of the invention, comprises a plurality of signal channels 11, 12, 13 and 14 which are connected to a plurality of low-level input signals, designated as inputs 1, 2, 3 and 4, respectively, which may be obtained from thermocouples or other similar low level signal producing means. Each channel is connected by lead 15 to double-pole, single-throw switch 16. Switch terminals 17 and 18 of switch 16 are connected to opposite ends of primary windings 19 and 21, respectively, of transformer 22. Center tap 23 of transformer 22 is connected by means of lead 24 to the other side of each signal channel.

Channels 11, 12, 13 and 14 contain a pair of cam driven switches 26, 27, 28 and 29, respectively, for successively feeding the various input signals to leads 15 and 25 at different times. A pair of switches is employed in each channel to enable center tap 23 of transformer 22 to float; but for many purposes only one switch is necessary in each channel if one side of all the input terminals are grounded.

Motor 31 drives the cams associated with switches 26–29 as well as cam 32 through gear 33. Cam 32 and gear 33 are arranged to drive the armature of switch 16 so it alternately contacts both terminals 17 and 18 for equal time periods each time one of the switches 26–29 is connected to supply its respective input signal to leads 16 and 24, i.e., when switch 26 is positioned to couple input signal 1 to leads 15 and 24, cam 32 positions switch armature 16 on terminal 18 for a certain time interval and repositions armature 16 on terminal 17 for an equal time interval.

The primary windings 19 and 21 of transformer 22 couple the signals supplied thereto to secondary windings 34 which feed A.C. amplifier 35, constituting a single output channel for the time division multiplex signal supplied thereto by input channels 11–14. The use of an A.C. rather than a D.C. amplifier with a modulated, time division multiplex signal of low level is highly advantageous because there is no drift associated therewith.

The voltage induced in secondary winding 34 of transformer 22 in response to a particular input signal is a single cycle A.C. signal amplitude modulated by the respective input signal. Since the frequecny of the switching apparatus is considerably greater than any expected frequency that will be supplied to the system by the transducers connected to channels 11–14, the amplitude of the positive and negative portions of the single cycle A.C. signal are substantially equal. With this arrangement, the magnetic core of the transformer is not permanently saturated in any direction and signal distortion is accordingly eliminated. As the various channels are connected to transformer 22, the voltage across secondary winding 34 comprises a time division multiplexed A.C. signal representative of the various input signals supplied to the respective channels 11–14.

The output signal from A.C. amplifier 35 is supplied to the primary winding 36 of transformer 37, having split secondary windings 38 and 39. Windings 38 and 39 are wound in the opposite directions so the voltages at the oppositely located dotted ends are of the same polarity for any particular complete cycle of switch 16. One end of secondary windings 38 and 39 are coupled to cam driven switches 41 and 42, respectively, both switches being connected to the junction between capacitors 33 and 34. The cams associated with switches 41 and 42 are driven by motor 31 through gear box 45 so they rotate at the same speed as cam 32, associated with swtich 16. Thus, when switch 16 alights on terminal 18, switch 42 is closed and switch 41 is open while opposite conditions of switches 41 and 42 prevail when switch 16 alights on terminal 17. The dotted ends of secondary windings 38 and 39 are connected to capacitors 43 and 44, respectively, which function as holding or storage means for the A.C. signals supplied thereto.

Accordingly, switches 41 and 42 as well as capacitors 43 and 44 serve as a sychronous rectifier for the A.C. signal applied thereto. The output voltage obtained between capacitors 43 and 44 is supplied to D.C. amplifier 45, the output voltage of which is an amplified undistorted, drift and noise free time division multiplexed replica of inputs 1–4. Amplifier 45 is preferably of standard design having high input impedance so loading of capacitors 43 and 44 is minimized. The amplifier output impedance should be sufficiently low to enhance matching with a suitable load, such as an analog to digital converter, that may be connected thereto.

Operation of the system disclosed in FIGURE 1 is best understood by reference to the timing diagram illustrated in FIGURE 2. Closing of switches 26, 27, 28 and 29 is represented in FIGURE 2 by the positive rectangular pulses in signal trains 46, 47, 48 and 49, respectively. From these signal trains, it is seen that cams associated with switches 26–29 are sequentially operated, i.e. at different times, so that input signals of each channel 11–14 are successively supplied to input windings 19 and 21 of transformer 22 at different times.

Timing signal 51 illustrates the manner in which cam 32 moves back and forth between terminals 17 and 18. Thus, switch armature 16 alights on terminal 17 one third of the time period switch 26 is closed; alights on terminal 18 the succeeding third of the same period and is traversing the distance between terminals 17 and 18 during the other third of the period.

Switch 26 is initially closed at time 52, FIGURE 2, and supplies input signal 1 connected thereto to leads 15 and 24. Initially, however, input signal 1 to channel 11 is not supplied to transformer 22 because armature 16 alights on neither terminal 17 nor 18, thus eliminating transient effects due to switching. When switch 26 has been closed for one-third of its period, i.e. when time 53, FIGURE 2 is reached, cam 32 is rotated sufficiently so armature 16 engages terminal 17 and input signal 1 is supplied across primary winding 19 of transformer 22. Armature 16 remains in contact with terminal 17 for one third of the closing period of switch 26, i.e., until time 54 is reached, at which time, cam 32 has rotated sufficiently to enable armature 16 to engage terminal 18, resulting in current being supplied to the other primary winding 21 of transformer 22. This mode of operation continues until the end of the closure period of switch 26 as designated at time 55. As switch 26 is opened by its associated cam, switch 27 is closed and the sequence is repeated for input signal 2 to channel 12. After the sequence for channel 12 is completed, channel 13 and subsequently channel 14 are connected to transformer 22 in a similar manner.

Although, four channels have been specifically disclosed it is to be understood any number of suitable channels may be employed. Also, the use of motor driven cams is primarily for illustrative purposes, electronic switches controlled by electronic pulse generators, as disclosed in FIGURE 3, being preferable.

The time division multiplex signals supplied by winding 34 through A.C. amplifier 35 to primary winding 36 are fed to windings 38 and 39. If it is assumed the signal applied to one of the channels 11 is positive, throughout the period in which switch 26 is closed, the signal at the upper end of transformer winding 34 is first positive and then negative, due to operation of switch armature 16. When this signal is coupled to the secondary windings 38 and 39 of transformer 37, the signal at the dotted ends of transformer winding 38 is positive when switch 41 is closed while the signal at the undotted end of transformer winding 39 is positive when switch 42 is closed, due to the reverse direction in which windings 38 and 39 are wound. Thus, during one portion of the cycle, a positive voltage is applied across terminals 56 and 57 of capacitor 43 and during another cycle portion, positive voltage is applied across terminals 57 and 58 of capacitor 44. The voltages across capacitors 43 and 44 are therefore subtracted from each other during the complete cycle and a D.C. voltage is supplied to amplifier 45. Capacitors 43 and 44 hold the signal supplied thereacross until the next signal is applied thereto. Thus, the input signal to D.C. amplifier 45 comprises a plurality of step voltages varying as the magnitude of the respective input voltages to channels 11–14 vary. Noise due to microphonics from mechanical disturbances is eliminated due to subtraction of the positive and negative signal portions by capacitors 43 and 44 and its relatively low frequency compared with the frequency of switch 16. This is evident because the noise polarity does not change with signal polarity under the influence of switch 16.

Figures 3, 4:
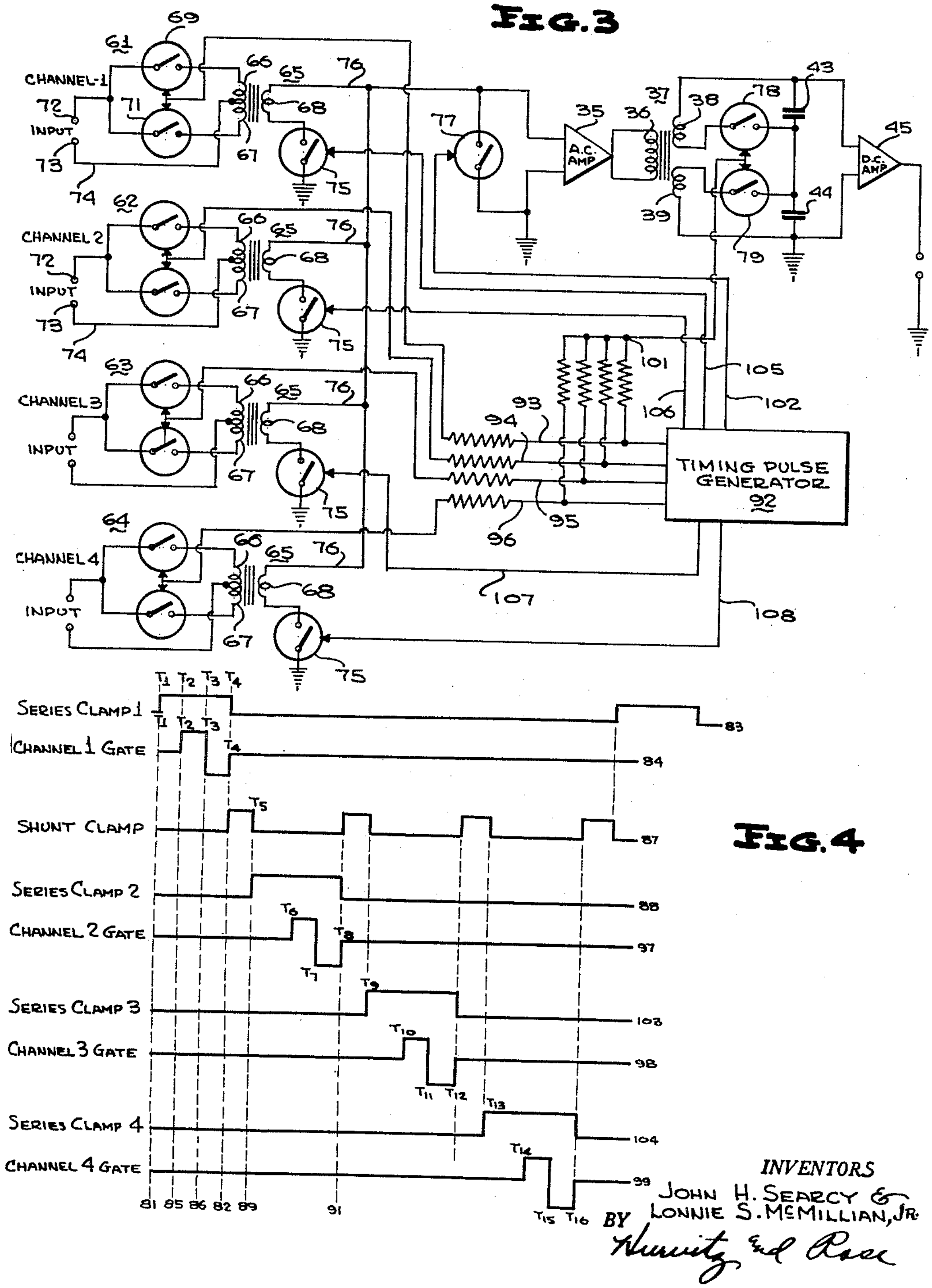
FIGURE 3 is a schematic diagram of another preferred embodiment of the present invention.
FIGURE 4 is a timing diagram associated with the apparatus of FIGURE 3.

FIGURE 3, disclosing an additional embodiment of the present invention, comprises four input channels 61, 62, 63 and 64. Each channel is identical and comprises a transformer 65 having primary windings 66 and 67 as well as a secondary winding 68. Switches 69 and 71 are connected between opposite ends of windings 66 and 67 and input terminal 72. The center tap between windings 66 and 67 of transformer 65 is connected to the other input terminal 73 by lead 74. Switches 69 and 71 are sequentially closed and reopened, thus supplying the input signal between terminals 72 and 73 to opposite windings 66 and 67 each time a particular channel is energized. Each channel is sequentially energized and deenergized so signals are supplied to the primary windings of transformers 65 at different times. Secondary windings 68 of transformers 65 are connected through a series switch 75 to ground and also to a single output channel by leads 76.

The signal of each input channel 61–64 is coupled by means of lead 76 to A.C. amplifier 35. The input circuit of A.C. amplifier 35 is shunted by switch 77, connected between the common lead of secondary windings 68 and ground, once each time an input channel is energized.

Switch 77 is closed only after both switches 69 and 71 are energized and reopened, thereby removing any capacitive storage that might occur in the secondary winding 68 of transformer 65. The voltage supplied by leads 76 to A.C. amplifier 35 is a plurality of single cycle A.C. signals amplitude modulated by the various input signals to channels 61–64.

The A.C. output signal of amplifier 65 is coupled through primary winding 36 to secondary windings 38 and 39 of transformer 37, supplying capacitors 43 and 44 in a similar manner to that for the output circuitry of FIGURE 1. The only difference between the output circuitry and FIGURES 1 and 3 is in switches 78 and 79 employed in the latter. Operation of switches 78 and 79 is synchronized with switches 69 and 71, respectively, of each input signal channel. Thus, switch 78 is only closed when switch 69 is closed and switch 79 is only closed when switch 71 is closed. In this manner, output transformer 37, switches 78 and 79 as well as capacitors 43 and 44 serves as a full wave rectifier, synchronous with the switching operation of each channel 61–64. The D.C. voltage across capacitors 43 and 44 is supplied to D.C. amplifier 45 of similar construction to the one in FIGURE 1.

Operation of the apparatus illustrated in FIGURE 3 is best understood by reference to the timing diagrams of FIGURE 4 As in the circuitry of FIGURE 1, it is assumed the expected fluctuations of the input signal applied to terminals 72 and 73 are of considerably lower frequency than the switching frequencies employed so there is no substantial change in the signals throughout a cycle of operation. Accordingly, in the following description, signals will be considered as positive D.C. voltages for convenience sake, it being realized they may be of any polarity and have a certain degree of fluctuation.

Each channel 61–64 is energized only when switches 75 are closed, thereby permitting the voltages in the secondary windings 68 to be supplied to the input terminals of A.C. amplifier 35. Thus, switch 75 of channel 61 is energized for the period between times 81 and 82, FIGURE 4, represented by the positive rectangular pulse in signal 83. Polarity responsive switch 69 remains open until time 85 when the positive pulse in signal 84 occurs. Switch 69 is closed at this time and remains in such position until time 86 when switch 71 is energized by the negative pulse in signal 84. Switch 71 remains closed between times 86 and 82; that is, until switch 75 is reopened. With switch 69 closed, current is supplied from input terminal 72 through switch 69 to primary winding 66 and back to input terminal 73 by lead 74. Subsequently, when switch 69 is open and switch 71 is closed, current flows through transformer winding 67 in the opposite direction from that in which it flowed through winding 66. Consequently, a single cycle A.C. voltage of amplitude proportional to the input signal between terminals 72 and 73 having a frequency equal to the operation of switches 69 and 71 is induced in the secondary winding 68.

After switch 75 is opened, switch 77 is closed, thereby shunting the input terminals of amplifier 35 and removing any capacitive storage in the secondary windings 68 of the various transformers 65. Shunting switch 77 remains closed until series switch 75 of channel 62 is energized at time 89, as shown by timing signals 87 and 88, FIGURE 4. Energization of channel 62 is continued between times 89 and 91, as illustrated by the rectangular pulse in signal 88, in exactly the same manner in which channel 61 is energized. The time interval 81–85 between energization of switches 75 and 69 prevents any undesirable switching transient in secondary winding 68 from affecting the output signal.

Timing pulse generator 92, FIGURE 3, supplies the various timing pulses illustrated in FIGURE 4 to the switching components in FIGURE 3. The positive and negative single cycle A.C. signals 84, 97, 98 and 99 are supplied by generator 92 through leads 93, 94, 95 and 96 and isolating resistors associated therewith to switches 69 and 71 of channels 61, 62, 63 and 64, respectively. The signals on leads 93–96 are also fed through further isolating resistors to summing node 101 and to switches 78 and 79 so switch 78 is closed each time switch 69 of each channel 61–64 is closed and switch 79 is closed each time switch 71 in each channel 61–64 is closed. Rectangular signal pulse train 87 is supplied by timing pulse generator 92 to shunting switch 77 by lead 102. Generator 92 also supplies clamping signals 83, 88, 103 and 104 for switches 75 of each channel by leads 105, 106, 107 and 108, respectively.

While the switches of FIGURE 3 are illustrated for schematic purposes as of the relay type, it is to be understood they may take any form and are preferably electronic components. For example, switches 69, 71, 75, 77, 78 and 79 may all be of the transistorized type.

FIGURE 5 is a schematic illustration of one form which channels 61–64 may take. The circuit comprises NPN transistor 111 and PNP transistor 112. The emitter electrodes of transistors 111 and 112 are connected directly to input terminal 72 and to one end of transformer 113 secondary winding. The other end of transformer 113 secondary winding is connected to the bases of transistors 111 and 112. The primary winding of transformer 113 is connected to timing pulse generator 92 which supplies the single cycle positive and negative pulses to it, as depicted by signal wave form 84, FIGURE 4. Thus, under quiescent conditions, when no pulses are supplied to transformer 113, transistors 111 and 112 are cut-off or are nearly cut-off. If any currents flow in balanced transistors 111 and 112, they are equal and cancel in transformer 113 so no output signal is obtained across secondary winding 68. Even if transistors 111 and 112 are not balanced, there is no signal in secondary winding 68 because direct current cannot be induced in a transformer secondary winding. The other input terminal 73 is connected through primary windings 67 and 66 to the collectors of transistors 111 and 112, respectively.

One end of secondary winding 68 of transformer 65 is connected to the collector of switching transistor 114, while its other end is connected to lead 76, coupled to A.C. amplifier 35, FIGURE 3. The emitter of NPN transistor 114 is connected to ground while the base thereof is supplied by rectangular pulse 83 from timing pulse generator 92. Signal 83 normally maintains transistor 114 cut off so no current can flow in winding 68. When pulse generator 92 supplies a positive rectangular pulse to the base of transistor 114, it becomes conductive and current flows in secondary winding 68, thereby permitting a signal to be supplied to amplifier 35.

Subsequently, when the positive portion of signal 84 is coupled by way of transformer 113 between the bases and emitters of transistors 111 and 112, transistor 112 is further cut off and transistor 111 is rendered conductive. When this occurs, the input signal between terminal 72 and 73 is fed through transistor 111 and primary winding 67 only of transformer 65. When the negative portion of signal 84 occurs, transistor 111 is cut off while transistor 112 is rendered conductive so the input signal between terminals 72 and 73 is supplied only through primary winding 66 of transformer 65. In this manner, the signal induced in the secondary winding 68 reverses polarity as input signal 84 supplied by pulse generator 92 does likewise.

This particular arrangement is highly advantageous because of the necessity for only two matched transistors in each channel and because low level input signals, such as supplied by thermocouples or other transducers need not be grounded, thereby permitting complete independence between the various signals. The output signal is maintained linear since there is no saturation of transformer 65 because the reverse currents in windings 66 and 67 during each cycle of operation removes any residuary flux.

While we have described and illustrated one specific embodiment of our invention, it will be clear that variations of the details of construction which are specifically illustrated and described may be resorted to without departing from the true spirit and scope of the invention as defined in the appended claims.

We claim:

1. A time division multiplex system for low-level analog signals comprising: a plurality of input channels, each channel including means, effective when energized, for sampling the analog signal conveyed thereby; means for sequentially energizing said sampling means, each for a predetermined period of the same duration for all of the channels; an output channel including magnetic core means having primary winding means and secondary winding means; switching means coupled to each of said sampling means for alternately applying the signal sampled thereby during each period to respective first and second equal portions of said primary winding means for equal parts of the period to reverse the polarity of the signal applied to said primary winding means at the conclusion of each part of the period, so that said magnetic core means is subjected to flux reversals of equal magnitude and duration during each period and is absent any residual magnetism at the conclusion of each period, the signal induced in said secondary winding means during each period thereby having an amplitude and phase representative respectively only of the magnitude and polarity of the analog signal from which it is derived; means coupled to said secondary winding means for amplifying each induced signal; synchronous converter means for converting each amplified signal cycle to a D.C. pulse of magnitude and polarity proportional to the amplitude and phase of said amplified signal cycle; and means for synchronizing the operation of said sequentially energizing means, said switching means and said synchronous converter means.

2. A time division multiplex system for low level variable D.C. signals, said system comprising a plurality of input channels; a single output channel; means for sequentially applying separate ones of said D.C. signals to respective separate ones of said input channels to produce a sequence of input analog pulses of equal period; a transformer having primary winding means, secondary winding means and core means; switching means for applying each input analog pulse to said primary winding means in alternate polarity samples for equal portions of said period so that during a portion of each pulse period there is applied to said primary winding means at least one pulse sample of the same polarity as that of the pulse derived from the input channel signal occurring during a corresponding period, and during an equal portion of each pulse period, an equal number of pulse samples of a polarity opposite to said same polarity, whereby equal magnetic fluxes of opposite senses are successively produced in said transformer core over each period so that there is an absence of residual flux in said transformer core at the conclusion of each period, the signal induced in said secondary winding means by said application of pulse samples to said primary winding means having an amplitude proportional to the magnitude of the input analog pulse from which it is derived; means for amplifying each signal induced in said secondary winding means; further switching means coupled to said amplifying means for sequentially sampling each amplified signal over portions of each respective period corresponding to said first mentioned portions; and means for additively combining the amplified signal samples over each period; said means for sequentially applying, said switching means, and said means for sequentially sampling being synchronously coupled.

3. A time division multiplex system for low-level input signals, said system comprising a plurality of separate input channels; a single output channel; each of said input channels including a separate gating circuit for passing respective input signals to said output channel; each gating circuit comprising a transformer having a pair of primary windings and a secondary winding and a magnetic core; switching means for coupling each of said primary windings in a respectively distinct conductive path; means for selectively energizing said switching means to alternately establish said distinct conductive paths to sample said respective input signal for equal intervals of a predetermined period; said distinct conductive paths including means for reversing the polarity of the sample signal upon application thereof to each primary winding respectively during said predetermined period; each gating circuit further including second switching means for providing a transmission path through said secondary winding to said output channel for passing an induced signal representative of said polarity-reversing sample signal; and means synchronizing the operation of said second switching means and said selectively energizing means for passing the induced signal related respectively to the input signal being sampled during that predetermined period to said output channel.

4. A time division multiplex system for low level input signals comprising a plurality of signal input channels; each of said signal input channels including first and second input terminals, a transformer having a pair of primary windings and a secondary winding and a magnetic core; first and second normally non-conductive transistor switches each coupling said first and second input terminals through a different one of said primary windings; means for alternately applying biasing potentials to said transistor switches to render each separately conductive in alternating fashion for equal intervals of a predetermined period, whereby the input signal conveyed by each channel is alternately applied to each of said primary windings through respectively alternate conductive paths for said equal intervals of said period; each of said primary windings being coupled in its respective conductive path to produce flux reversal in said transformer as said transistor switches are rendered alternately conductive so that there is an absence of residual flux in said transformer core at the conclusion of each said period; a common output channel; means for sequentially coupling the respective transformer secondary winding of each input channel to said common output channel, each for said predetermined period; said output channel including means for amplifying each signal induced in each secondary winding during the respective period each is coupled to said output channel; means for converting each amplified induced signal to D.C. pulses of said equal intervals; means for additively combining said pulses in the same polarity; and means for synchronizing the operation of said means for alternately applying biasing potentials, said means for sequentially coupling, and said means for converting.

5. In a time division multiplex system for transmitting intelligence from a plurality of low-level analog signals to a common signal channel, the combination comprising a plurality of sampling circuits each responsive respectively to a separate one of said analog signals; each of said sampling circuits including primary winding means, a core and secondary winding means inductively coupled to said primary winding means via said core, switching means for coupling a portion of said primary winding means in conductive circuit for passage of the analog signal to which the sampling circuit is responsive and for coupling another portion of said primary winding means in a further conductive circuit for passage of said last-mentioned analog signal, means for energizing said switching means to alternately establish said first-mentioned and said further conductive circuits for equal time intervals of a predetermined period; said primary winding means being arranged to reverse the polarity of the analog signal applied to each of said portions thereof upon consecutive establishment of said conductive circuits; and means synchronously coupled to said switching means for sequentially establishing a conductive path through the secondary winding means of each sampling circuit to respectively pass the signal induced therein to said common signal channel during said predetermined period.

6. In a time division multiplex system for transmitting information from a plurality of input channels to a single output channel, said input channels having input terminals for respective application of low level information bearing signals thereto, a switching circuit for sequentially coupling said input channels to said single output channel, each input channel being coupled to said output channel for a predetermined time interval of equal duration for all channels, said switching circuit comprising in combination magnetic circuit means having primary winding means, and secondary winding means inductively coupled to said primary winding means, means for selectively connecting a different one of said channels in conductive circuit through respectively distinct first and second equal portions of said primary winding means during each time interval, said equal portions of said primary winding means being coupled to provide opposite polarities, one from the other, of signal applied to each, means for energizing said selectively connecting means to alternately establish conductive connection through said first and second equal portions of said primary winding means over equal parts of the time interval during which said one channel is coupled to said single output channel, means for sequentially completing a circuit between the input terminals of each input channel and said output channel through said secondary winding means, so that each circuit is completed for a respective time interval, and means for synchronizing the operation of said selectively connecting means and said circuit completing means.

7. An electronic switching system for low level signals comprising a plurality of signal input circuits, a signal output circuit, means coupled to each of said input circuits for converting D.C. input signals to A.C. signals of amplitude and phase proportional respectively to input signal magnitude and polarity, magnetic core structure means, input winding means and output winding means coupled via said magnetic core structure means, each of said means for converting including a pair of normally non-conductive transistors each coupled to a separate portion of said input winding means to provide separate coupling paths between an input circuit and each of said separate portions of said input winding means, control means for alternately biasing each of said transistors to a conductive state to alternately develop a conductive path between said input circuit and a first portion of said input winding means and between said input circuit and a second portion of said input winding means, each conductive path being connected to reverse the polarity of the D.C. signal transferred thereby from that of the D.C. signal transferred by the other conductive path, said output winding means being coupled to said signal output circuit, means for sequentially completing a signal transfer circuit between each input circuit and said output circuit for equal intervals of time, and means for synchronously energizing said control means and said circuit completing means to effect said polarity reversal for equal durations of each time interval, so that the polarity reversals of the D.C. signals induce distinct complete cycles of A.C. signals representative thereof in said output winding means during each time interval, said output circuit including amplifier means for amplifying said A.C. signals, means coupled to said amplifier means for rectifying said A.C. signals synchronously with said equal durations of each time interval to produce alternate polarity D.C. pulses therein, and means for additively combining said pulses in the same polarity to reject noise common to the alternate polarity pulses.

8. A time division multiplex system for low level D.C. analog input signals, comprising a plurality of input signal channels each for conveying a different one of said input signals; switch means for synchronously and simultaneously converting the input signals pertaining to all of said input channels to complete cycles of A.C. signals composed only of equal duration pulses of opposite polarities and having amplitudes proportional to the respective channel input signals; an A.C. amplifier common to all said channels; sequential means conveying said complete cycles of A.C. signal in succession to said A.C. amplifier for amplification thereby; a synchronous converter connected to said A.C. amplifier for converting the output of said A.C. amplifier to a single D.C. analog signal; said synchronous converter and said switch means each including a transformer having a magnetic core; and means synchronizing said switch means, said sequential means and said synchronous converter to produce, sequence and convert said complete cycles of A.C. signals composed each of equal numbers of said equal duration pulses of opposite polarities for each of said channels such that all said cores are de-magnetized on initiation of each operation of said sequential means to convey complete cycles of said A.C. signal to said amplifier in succession for amplification thereby.

9. A time division multiplex system for low level D.C. analog signals, comprising a group of channels each carrying a low level analog signal; each of said channels including a pair of leads; each of said channels further including an associated transformer having a first and a second primary winding of equal number of turns, a secondary winding and a common magnetic core for said first and second primary windings and said secondary winding; separate switching means for connecting each of said pairs of leads in alternation for equal times to the associated first primary winding and second primary winding; said first and second primary windings having such relative winding senses that successive equal pulses of opposite polarities are induced in the associated secondary winding; a common A.C. amplifier for all said channels; further switching means for connecting the transformer secondary winding of each respective channel to said A.C. amplifier in sequence so that each secondary winding is respectively connected to said A.C. amplifier for a period during which precisely two of said successive equal pulses of opposite polarity are induced therein, whereby successive single cycle pulse trains, each pertaining to a different one of said channels and each composed of a pair of pulses of opposite polarities, are applied to said A.C. amplifier for amplification thereby, and said cores are de-magnetized at the conclusion of each of said single cycle pulse trains; a synchronous A.C. to D.C. converter; a further transformer coupling said A.C. amplifier to said synchronous A.C. to D.C. converter; said further transformer having a further magnetic core; means synchronizing the operation of said separate switching means, said further switching means, and said synchronous converter so that said further magnetic core is de-magnitized following each A.C. to D.C. conversion of each of said successive single cycle pulse trains; and an analog output channel connected to said synchronous A.C. to D.C. converter.

10. A time division multiplex system for low-level D.C. analog signals, comprising a group of channels each carrying a low-lever analog signal; a single transformer including a first primary winding and a second primary winding, a magnetic core, and a secondary winding; a single pair of leads for conveying signals to said first primary winding and said second primary winding; switching means connecting said channels in succession for equal time intervals to said single pair of leads; further switching means for connecting said first and second primary windings in succession for equal times to said single pair of leads during each of said equal time intervals, said first and second primary windings being wound to induce oppositely poled pulses in said secondary winding; an A.C. amplifier having an input circuit connected to said secondary winding; an output circuit for said amplifier; an output transformer connected to said output circuit, said output transformer including a further magnetic core; an A.C. to D.C. synchronous converter connected to said output transformer; and means synchronizing the operation of all said switching means and of said synchronous converter, whereby said mores are de-magnetized at the initiation and termination of each of said equal time intervals.

References Cited by the Examiner

UNITED STATES PATENTS

| | | | |
|---|---|---|---|
| 2,798,160 | 7/57 | Bruck et al. | 321—2 |
| 2,875,427 | 2/59 | Koppel et al. | 340—183 |
| 2,958,857 | 11/60 | Johnson et al. | 179—15 |
| 2,980,861 | 4/61 | Popowsky | 330—10 |
| 3,069,655 | 12/62 | Newbold | 340—183 |
| 3,070,663 | 12/62 | Searcy | 179—15 |

OTHER REFERENCES

Electronics, July 1, 1960, pages 55–57 relied on.

DAVID G. REDINBAUGH, *Primary Examiner.*

ROBERT H. ROSE, *Examiner.*